Figure 1:
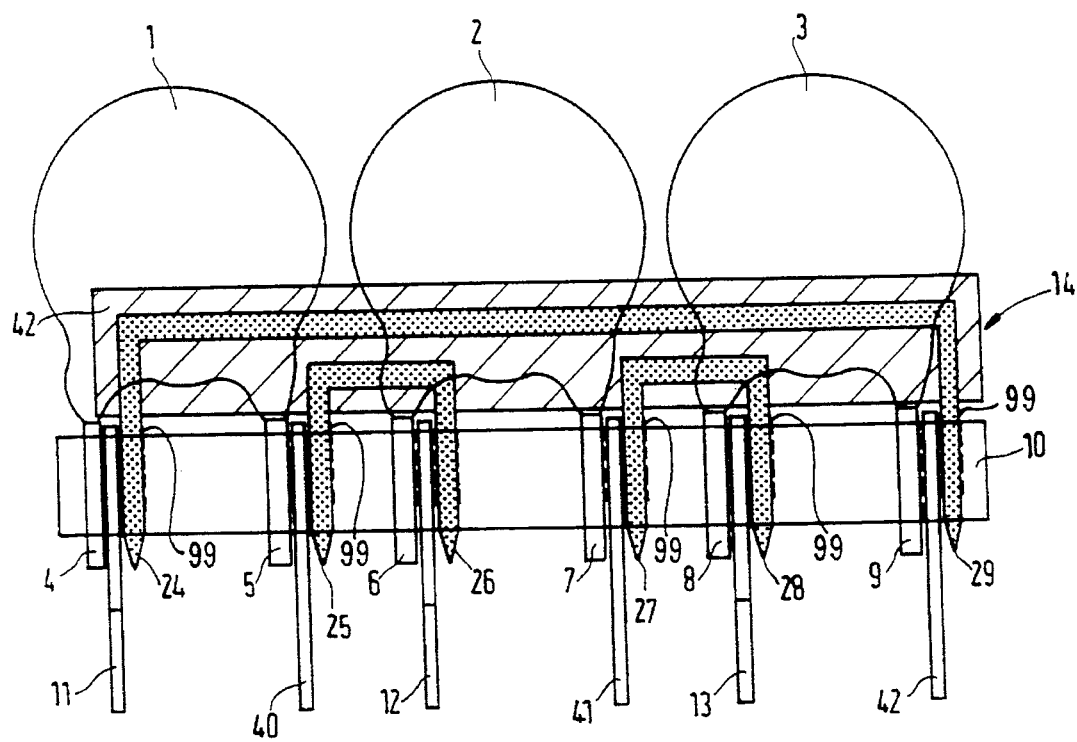

United States Patent [19]

Lorrain

[11] Patent Number: 5,586,908
[45] Date of Patent: Dec. 24, 1996

[54] SAFETY UNIT FOR AN ELECTRIC 3-PHASE CIRCUIT

[75] Inventor: Henri L. P. Lorrain, Brussels, Belgium

[73] Assignee: U.S. Philips Corporation, New York, N.Y.

[21] Appl. No.: 302,140

[22] Filed: Sep. 7, 1994

[30] Foreign Application Priority Data

Sep. 8, 1993 [BE] Belgium ................................ 09300942

[51] Int. Cl.⁶ ...................................................... H02H 9/04
[52] U.S. Cl. ............................................. 439/511; 361/56
[58] Field of Search ..................................... 439/189, 507, 439/620, 511; 310/68 C; 361/23, 24, 33, 47, 56

[56] References Cited

U.S. PATENT DOCUMENTS 4,333,119   6/1982   Schoenmeyer ............................ 361/76
5,010,438   4/1991   Brady ........................................ 361/56

FOREIGN PATENT DOCUMENTS

4042306A1   2/1992   Germany.
1497277     1/1978   United Kingdom.

Primary Examiner—Neil Abrams
Attorney, Agent, or Firm—Arthur G. Schaier

[57] ABSTRACT

The invention relates to a safety unit for an electric 3-phase circuit for use in, for example, an electric motor. The safety unit comprises three semi-conducting components (1, 2, 3) each of which has a first terminal (4, 6, 8) and a second terminal (5, 7, 9). The safety unit also comprises a support (10) having three contact pins (11, 12, 13) as well as an insertive module (14). The components are secured to the support and electrically contact one of the contact pins (11, 12, 13) via the first terminals (4, 6, 8). Desired electric interconnections between the terminals are established by means of the insertive module (14) via receptive apertures in the support. Such a safety unit exhibits a great sturdiness and a high electrical safety. In addition, the use of specially constructed insertive modules enables a "star" configuration to be converted into a "delta" configuration, and conversely, in a simple manner.

7 Claims, 2 Drawing Sheets

SAFETY UNIT FOR AN ELECTRIC 3-PHASE CIRCUIT

The invention relates to a safety unit for an electric 3-phase circuit, said safety unit comprising three semi-conducting components which are each provided with a first terminal and a second terminal.

A unit of the above-mentioned type is used for protecting a 3-phase electric circuit against sudden voltage or current changes in, for example, electric motors or alternators, as well as for protecting the electrical mains in houses. For the semi-conducting component use can be made, inter alia, of diodes such as the so-called "break over diode" (B.O.D) which is used in telephony. However, for the semi-conducting component use is preferably made of a non-linear resistor in the form of a VDR (voltage-dependent resistor). In that case, the safety unit is used to compensate for the effects of changes in current intensity in a three-phase circuit.

A safety unit of the type mentioned in the opening paragraph is known per se. Said safety unit is an assembly of three VDRs, the second terminals being electrically interconnected by a soldered joint. The assembly is attached to the electric circuit of an electric motor via the first terminals and soldered-on current-supply wires. In this embodiment, the unit is constructed as a so-called "star configuration". A safety unit of the so-called "delta-configuration" type can be manufactured by connecting the (in total six) different terminals of the three resistors in a different manner.

A disadvantage of the known safety unit is that the sturdiness of the construction is insufficient. In addition, the electrical safety of the known unit leaves much to be desired. In practice, it is very disadvantageous that a unit manufactured in the delta configuration can hardly, or perhaps not at all, be changed into the star configuration, or conversely. Consequently, the purchaser of the unit is tied to one of said two configurations. Also the fact that for the manufacture of said two different configurations, in fact, two different production processes are required is considered to be a drawback.

It is an object of the invention to overcome the above-mentioned disadvantages and drawbacks. The invention more particularly aims at providing an electrically safe and sturdy safety unit. The invention further aims at providing a safety unit which can be converted from a delta configuration into a star configuration in a simple manner.

These and other objects of the invention are achieved by a safety unit of the type mentioned in the opening paragraph, which is characterized in that the safety unit also comprises a support having three contact pins as well as an insertive module, the components being secured to the support and electrically contact one of the contact pins via the first terminals, and desired electric interconnections between the terminals can be established by means of said insertive module via receptive apertures in the support.

By virtue of the presence of a support on which the resistors are secured, the sturdiness of the safety unit is much better than that of the known unit. Due to the fact that the terminals are in principle enclosed in the support, the electrical safety of the inventive unit is much better than that of the known safety unit. Since the safety unit comprises a detachable insertive module, it is up to the purchaser of the unit to decide whether the unit will operate in the star configuration or the delta configuration. It is noted that the support may optionally be part of a so-called "printed circuit board" (PCB). Such a printed circuit board comprises conductor tracks and, optionally, further electric components. Preferably, however, a separate support is used, for example, in the form of a housing of an electrically insulating material, such as synthetic resin.

A preferred embodiment of the safety unit is characterized in that the insertive module comprises three electrical connection pins, which establish an electric interconnection between the second terminals of the components after the module has been inserted into the support. By using such a module a safety unit is obtained in which the components are connected in the star configuration.

Another preferred embodiment of the safety unit in accordance with the invention is characterized in that the insertive module comprises six electrical connection pins, which establish an electric interconnection between a first terminal of a component and a second terminal of one of the other components after the module has been inserted into the support. The use of such a module results in a safety unit in which the semi-conducting components are connected in the delta configuration.

The above embodiments of the safety unit in accordance with the invention enable the configuration of the unit to be changed in a simple manner by exchanging a specific insertive module for another insertive module. This operation can be carried out by the purchaser. It is noted that a selected configuration can be made permanent by soldering the connection pins present in the module to the terminals of the three components.

A particularly favourable embodiment of the invention is characterized in that the insertive module comprises a first insertive portion having three electrical connection pins, so that after the insertion of this first insertive portion of the module into the support the second terminals of the components are electrically interconnected, and in that the insertive module also comprises a second insertive portion having six electrical connection pins, so that after the insertion of this second insertive portion of the module into the support a first terminal of a component and a second terminal of one of the other components are electrically interconnected.

By means of the latter embodiment of the invention, both interconnection possibilities are realised in the same insertive module. The purchaser can change from the delta configuration to the star configuration, and conversely, by simply inserting the module into the support in a different manner.

Figure 2:
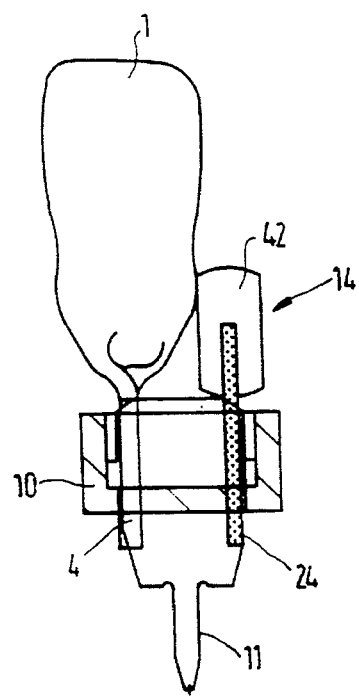

The invention will be explained in greater detail by means of exemplary embodiments and with reference to the accompanying drawing, in which FIG. 1 is a diagrammatic front view of an embodiment of the safety unit in accordance with the invention, in which the insertive module comprises six electrical connection pins FIG. 2 is a side view of the safety unit shown in FIG. 1

Figure 3A:
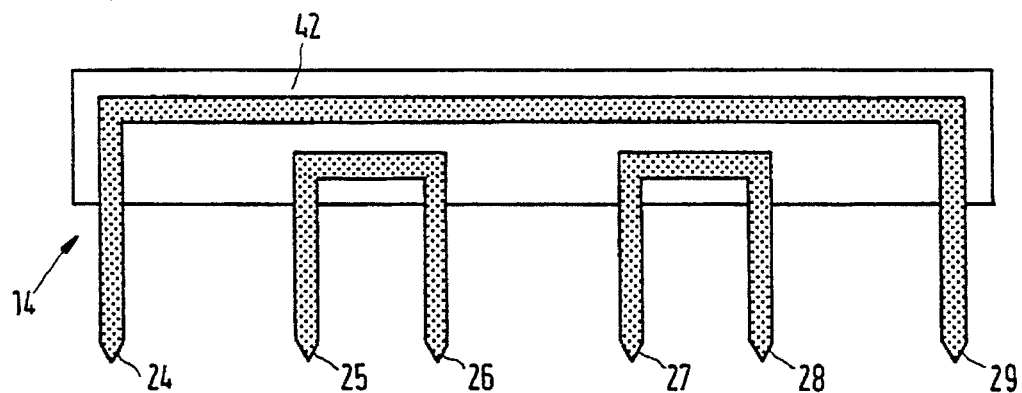
Figure 3B:
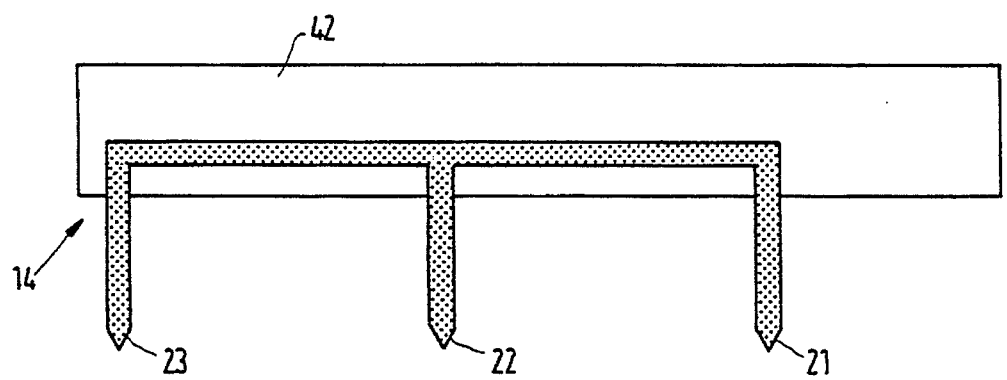
Figure 3C:
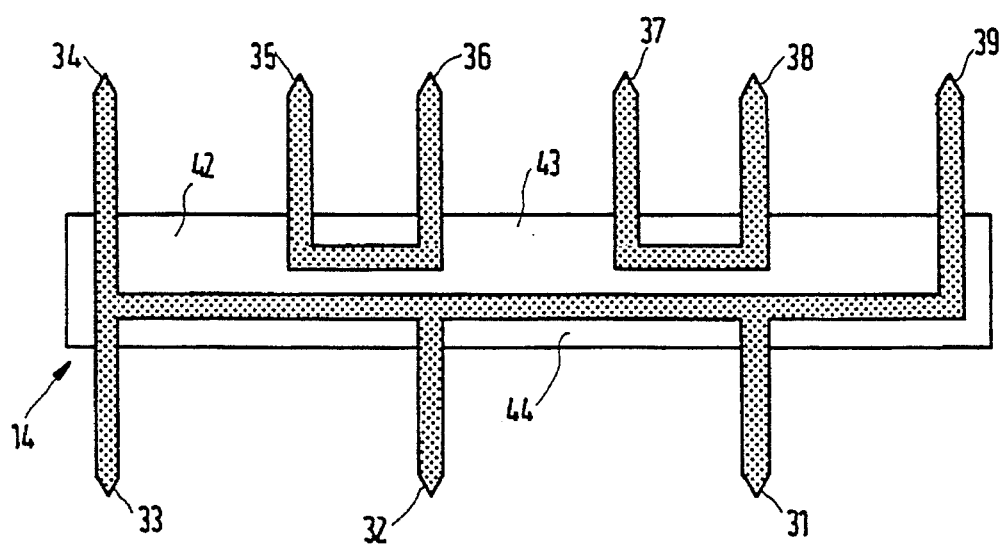

FIGS. 3A, 3B and 3C show three insertive modules for use in the safety unit in accordance with the invention.

The safety unit of FIG. 1 comprises 3 semi-conducting components in the form of voltage-dependent resistors 1, 2 and 3. Said resistors comprise a cylindrical resistor body of sintered material, which is provided with an electrode layer on both flat sides. Each of said resistors is provided with a first terminal 4, 6 and 8 connected to the one electrode layer and with a second terminal 5, 7 and 9 connected to the other electrode layer. An electrically insulating lacquer layer is applied to the resistor body, the electrode layers and a part of the radially projecting terminals.

The three resistors are secured to a support 10 by means of said terminals. This support is made of an electrically insulating material, preferably synthetic resin. In the present case use is made of polybutylene terephtalate. Other synthetic resins, such as polyamide, may alternatively be used. The support further comprises three metal contact pins 11, 12 and 13. Said pins electrically contact the first terminals 4, 6 and 8, for example by clamping. In order to obtain a long-lasting electric contact of low electric resistance, the contact pins are preferably soldered to the terminals. The three contact pins which are connected to the first terminals are intended for further connections to the electric circuit to be protected of an electric motor. In the present case, the support also comprises three further contact pins 40, 41 and 42. Said contact pins increase the adhesive strength of the unit after it has been inserted into a PCB. However, the presence of the second group of three contact pins is not necessary from the point of view of the operation of the unit in accordance with the invention.

The safety unit in accordance with the invention also comprises a detachable insertive module 14. This module consists of an electrically insulating holder 42, preferably of synthetic resin such as polybutylene terephtalate or polyamide. Said holder is provided with a number of electrical connection pins. The present module has six connection pins 24, 25, 26, 27, 28 and 29 which are electrically interconnected in pairs. For clarity, the holder is drawn in such a manner that the electric interconnection enclosed in the holder is visible. The insertive module can be secured to the support via the receptive apertures 99 in the support, in such a manner that the connection pins electrically contact the contact pins and the terminals. If desired, the contact pins, the terminals and the connection pins can be permanently interconnected via a soldered joint. A durable joint between these elements is obtained by soldering.

FIG. 2 is a diagrammatic side view of the safety unit shown in FIG. 1. Corresponding parts bear the same reference numerals. It is noted that in the above-described embodiment use is made of VDRs having leads. However, it is alternatively possible to use leadless components instead of components having leads. The former type of components is customarily referred to as SMD components. Such VDRs or diodes constructed as SMDs are soldered to the contact pins of the support, preferably, via their contact faces.

FIG. 3 shows three insertive modules 14 which can be used in the safety unit in accordance with the invention. For clarity, the electric interconnections in the holder are made visible in the Figure. The module shown in FIG. 3-A is the same as the module described with reference to FIG. 1. Said insertive module comprises a synthetic resin housing 42 and six connection pins 24, 25, 26, 27, 28 and 29. Use is made of a specially constructed module which comprises pairs of connection pins which are interconnected. Said pairs are 24, 29; 25, 26 and 27, 28. When such an insertive module is inserted into the support of the safety unit, every first terminal of a resistor is electrically connected to a second terminal of another resistor in a simple manner. This corresponds to a safety unit of the delta configuration.

The insertive module 14 shown in FIG. 3-B comprises three connection pins 21, 22 and 23 which electrically contact each other. When a module constructed in this manner is correctly inserted into the support, the second terminals 5, 7 and 9 are interconnected. This corresponds to a safety unit of the star configuration.

FIG. 3-C shows an insertive module 14 comprising a first insertive portion 43 and a second insertive portion 44. Insertive portion 43 has six connection pins (34, 35, 36, 37, 38 and 39) and an insertive portion 44 having three insertive pins (31, 32 and 33). The construction of the interconnections of this module is essentially based on that of the modules shown in FIGS. 3-A and 3-B. If this module is used, either one of the above-mentioned configurations can be converted to the other one in a simple manner by inserting the module into the support via the other insertive portion.

The safety unit in accordance with the invention has the advantage of a greater sturdiness and a higher electrical safety. In addition, the presence of a detachable insertive module enables a delta configuration to be converted into a star configuration, and conversely, in a simple manner.

I claim:

1. A safety unit for an electric 3-phase circuit, said safety unit comprising: three semi-conducting components each provided with a first terminal and a second terminal; a support having three contact pins, each contact pin respectively electrically couplable to a respective first terminal, said support further including a plurality of receptive apertures formed therein; and an insertive module having a plurality of connection pins for selectively electrically interconnecting a respective first terminal and a respective contact pin within said respective receptive apertures.

2. The safety unit as claimed in claim 1, wherein the insertive module comprises three electrical connection pins, which establish an electric interconnection between the second terminals of the components after the module has been inserted into the support.

3. The safety unit as claimed in claim 1, wherein the insertive module comprises six electrical connection pins, which establish an electric interconnection between a first terminal of a resistor and a second terminal of one of the other components after the module has been inserted into the support.

4. The safety unit as claimed in claim 1, wherein the insertive module comprises a first insertive portion having three electrical connection pins, so that after the insertion of this first insertive portion of the module into the support the second terminals of the components are electrically interconnected, and in that the insertive module also comprises a second insertive portion having six electrical connection pins, so that after the insertion of the module into the support a first terminal of a component and a second terminal of one of the other two components are electrically interconnected.

5. The safety unit as claimed in claim 1, wherein the insertive module comprises three electrical connection pins for electrically interconnecting each of the second terminals of the components.

6. The safety unit as claimed in claim 1, wherein the insertive module comprises six electrical connection pins each respectively interconnectable between a first terminal of one of the three components and a second terminal of another of the three components.

7. The safety unit as claimed in claim 1, wherein the insertive module comprises a first insertive portion having three electrical connection pins for electrically interconnecting each of the second terminals and a second insertive portion having six electrical connection pins for electrically interconnecting a first terminal of a first component and a second terminal of another of the three components.

* * * * *